Oct. 2, 1934.  L. MARTINAGE  1,975,725
VEHICLE
Filed June 24, 1931
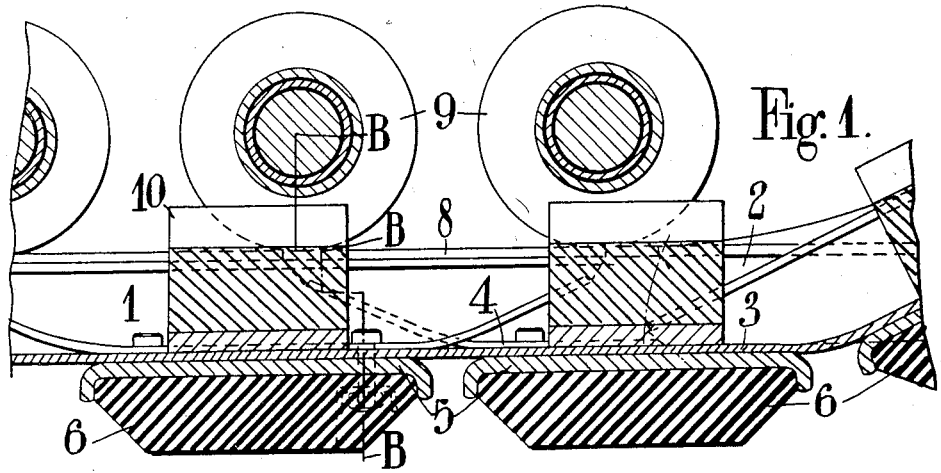
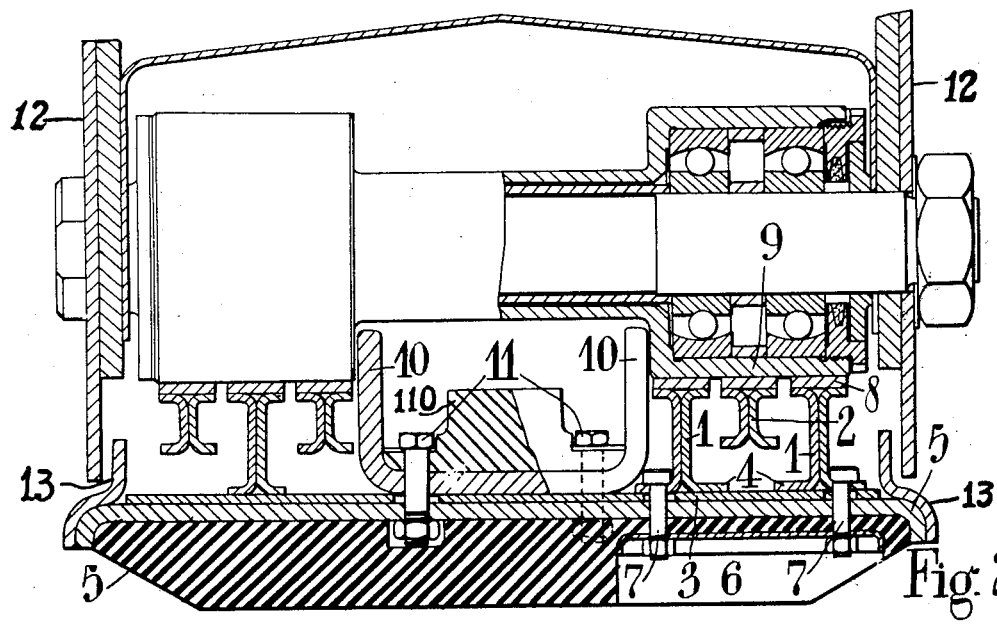
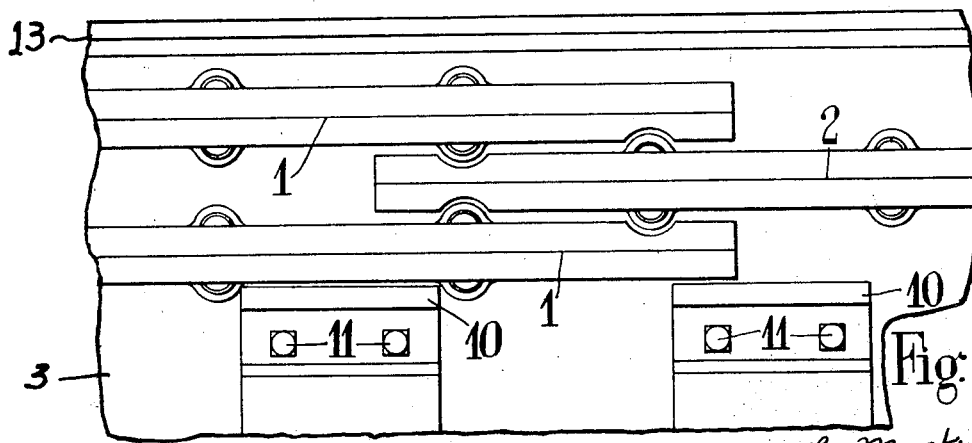
INVENTOR.
L. Martinage
By Marks & Clerk
Attys.

Patented Oct. 2, 1934

1,975,725

UNITED STATES PATENT OFFICE 1,975,725

VEHICLE

Léon Martinage, Paris, France

Application June 24, 1931, Serial No. 546,645
In France February 26, 1931

4 Claims. (Cl. 305—9)

This invention relates to endless track vehicles and is a development in or modification of the invention claimed in my co-pending application Serial No. 545,338, filed June 18, 1931.

In the main specification there is described a rolling band or endless track for all mechanical or animal traction vehicles, mechanical transporters, or other applications, of the type which is rigid in one direction and flexible in the other, the essential characteristic of the said rolling band consisting in the fact that on account of the combined arrangement of the links of the chain and of the rollers, the said chain acquires a transient rigidity from the fact of its bearing upon its train of rollers.

The present invention has for its object a modification of the method of constructing the endless chain that formed the subject of the main application.

An essential characteristic of the modified arrangement consists in the method of uniting the various links or rails to one another. Other characteristics, which are secondary, relating particularly to modifications in the various parts of the chain, will moreover be hereinafter described with reference to the annexed drawing, which represents by way of example one method of constructing the improved chain according to the present invention.

In the drawing:—

Figure 1 is a view of the chain in longitudinal section showing the track rollers;

Figure 2 is a view in transverse section along the line B—B—B in Figure 1;

Figure 3 is a fragmentary plan view and showing the track frame, and the superstructure and rollers removed.

The improved chain presents the same characteristics of transient rigidity as the chain that formed the subject of the main application, this temporary rigidity resulting from the fact that since the distance between the pivots of two consecutive rollers is less than the pitch of the chain, the rear lug of one rail and the front lug of the next rail are always supported by two consecutive rollers.

As in the form of construction according to the main application, the rails, such as 1, 2, are of a substantially trapezoidal shape, each extremity of each of them constituting a sort of lug, the height of which decreases towards each of the extremities of the rail, over a length approximately equal to half the pitch of the chain.

An essential characteristic of the improved arrangement forming the subject of the present invention consists in the fact that the various rails, instead of being connected with one another by a mechanical articulation, are connected by a flexible band 3, which may consist of any suitable material, and may for example be of metal of comparatively slight thickness, or of leather, balata, india rubber, cotton, camel's hair, or any combination of flexible products.

The rails, such as 1, 2, overlap one another as illustrated in Figure 3, and bear by their lower faces 4 upon the flexible band 3, to which are furthermore fixed, through the medium of soles or shoes 5, the tread blocks 6, which are fixed for example by means of the bolts 7 and formed preferably from rubber.

The upper face 8 of each of the rails 1 or 2, bears upon the rolling rollers 9. The arrangement of these rails formed of iron or metal sections or assemblages of iron or metal sections in the form of angles, channels, T's, double T's, or other sections, enables the number of the said rails for a given breadth of chain to be reduced to the utmost possible extent.

The guiding of the chain is effected by angle members such as 10, the webs of which (Figure 1) project above the rolling face of the rails and bear upon the inner face of the rollers 9.

The guiding angles 10 are themselves fixed to the flexible band 3 by means of bolts 11. In the case of the direct drive, the driving of the chain may be obtained for example by means of blocks 110, forming teeth, secured in the central portion of the chain, or by means of any equivalent member. These blocks, which may be made, for example, from a suitable rubber composition, may be held by means of the bolts 11 which fix the angle bars 10. The lateral forces due to the rolling may be transmitted directly from the shoes and tread blocks to the rollers 9, and without the flexible band 3 being subjected to these forces. The fixed pivots of the rollers 9 are carried by the frame 12. The opposite sides of the band 3 have secured thereto in any approved manner guide strips 13.

The mode of operation of the chain is the same as that which has been described in the main specification, but owing to the substitution of a flexible band for the mechanical articulation of the links the following advantages are obtained:—

The elimination of the necessity for lubrication, which constitutes one of the most serious disadvantages of the existing rigid chains;

The simplification of the machining and of the mounting;

The diminution of the weight of the chain per metre run, which enables a much greater speed to be obtained.

Having now described my invention, what I claim as new and desire to secure by Letters Patent is:—

1. An endless track system for vehicles comprising in combination an endless band, a plurality of rails secured in sets, one set on each side of said band, said rails in each set having extensions so that the ends of adjacent rails overlap one another, and load supporting rollers enlarged at opposite ends and contracted between said enlarged end portions and adapted to bear upon both said sets of rails, shoes carrying tread blocks extending under both sets of rails and across the endless band.

2. An endless track system for vehicles comprising in combination an endless band, a plurality of rails secured in two separates sets, one set on each side of said band, said rails having extensions so that the ends of adjacent rails overlap one another, and load supporting rollers, each of said rollers being enlarged at opposite ends and contracted between said enlarged end portions and which bear upon the respective sets of rails, each rail being extended in length to always bear on at least two rollers as the band and rails pass under the rollers.

3. An endless track system for vehicles comprising in combination an endless band, a plurality of rails secured in sets, one set on each side of said band and each rail extended so that the ends of adjacent rails overlap one another and load supporting rollers each enlarged at opposite ends and contracted between said enlarged end portions and each of which enlarged ends bears upon a set of rails, each rail being extended in length so as to bear continuously on at least two rollers and guide members attached to said bands and extending up between said sets of rails and enlarged portions of said rollers.

4. An endless track system for vehicles comprising in combination an endless band, a plurality of rails secured in sets on said band, one set on each side of the band, said rails being extended so that the ends of adjacent rails overlap one another and load supporting rollers enlarged at opposite ends and contracted between said enlarged end portions, the enlarged end portions bearing upon said sets of rails, shoes and tread blocks extending under both sets of rails, and guide members attached to said shoes and band and extending up between the sets of rails and the enlarged portions of said rollers.

LÉON MARTINAGE.